US008924365B2

(12) United States Patent
Myers et al.

(10) Patent No.: US 8,924,365 B2
(45) Date of Patent: Dec. 30, 2014

(54) SYSTEM AND METHOD FOR RANGE SEARCH OVER DISTRIBUTIVE STORAGE SYSTEMS

(75) Inventors: Jesse Myers, San Francisco, CA (US); Scott Hotes, Berkeley, CA (US); Todd Hodes, Emeryville, CA (US)

(73) Assignee: WaveMarket, Inc., Emeryville, CA (US)

(*) Notice: Subject to any disclaimer, the term of this patent is extended or adjusted under 35 U.S.C. 154(b) by 418 days.

(21) Appl. No.: 13/250,128

(22) Filed: Sep. 30, 2011

(65) Prior Publication Data

US 2012/0203745 A1 Aug. 9, 2012

Related U.S. Application Data

(60) Provisional application No. 61/440,844, filed on Feb. 8, 2011.

(51) Int. Cl.
*G06F 17/30* (2006.01)

(52) U.S. Cl.
CPC ...... *G06F 17/3033* (2013.01); *G06F 17/30353* (2013.01)
USPC ............................ 707/691; 707/698; 707/703

(58) Field of Classification Search
CPC .............................................. G06F 17/30371
USPC .......................... 707/616, 698, 690, 703, 691
See application file for complete search history.

(56) References Cited

U.S. PATENT DOCUMENTS

| | | | |
|---|---|---|---|
| 6,460,026 B1 | 10/2002 | Pasumansky | |
| 6,931,418 B1 | 8/2005 | Barnes | |
| 7,356,549 B1* | 4/2008 | Bruso et al. | 707/696 |
| 8,819,076 B2 | 8/2014 | Myers et al. | |
| 2002/0087570 A1 | 7/2002 | Jacquez et al. | |
| 2004/0083336 A1 | 4/2004 | Stark et al. | |
| 2006/0271281 A1 | 11/2006 | Ahn et al. | |
| 2008/0162510 A1* | 7/2008 | Baio et al. | 707/100 |
| 2010/0287144 A1 | 11/2010 | Cha et al. | |
| 2012/0036163 A1 | 2/2012 | Myers et al. | |

OTHER PUBLICATIONS

Ramabhadran, Prefix Hash Tree: An Indexing Data Structure over Distributed Hash Tables (2004), pp. 1-12.*

(Continued)

*Primary Examiner* — Albert Phillips, III
(74) *Attorney, Agent, or Firm* — Dovas Law P.C.

(57) ABSTRACT

This invention pertains generally to a method for resolving and managing eventual consistency conflicts when using a Prefix Hash Tree ("PHT") in which the underlying storage system is a Distributed Hash Table ("DHT"). An embodiment according to the within invention comprises a computer implemented method for resolving eventual consistency conflicts when using a PHT and DHT. The method includes using an algorithm to create a prefix hash tree that relates to a distributed hash table, the prefix hash tree having multiple nodes, wherein the nodes comprise leaf nodes and internal nodes, aggregating all distinct records across all conflicting nodes, wherein conflicting nodes are nodes that have identical data records, and counting records returned to obtain an aggregated record count; splitting the conflicting nodes that have the aggregated record counts that exceeding a max record count, such that the aggregated records are divided by a prefix into each new node, resulting in the consolidation of duplicate data that were in conflicting nodes into a single data record in a single node; and splitting conflicting nodes that are internal nodes regardless of the aggregated record count.

20 Claims, 6 Drawing Sheets

(56) References Cited

OTHER PUBLICATIONS

Silvia Cristina Sardela Bianci, "Load-Balanced Structures for Decentralized Overlays" Universite de Neuchatel, pp. 1-171, 2008.

Decandia, Giuseppe et al., Dynamo: Amazon's Highly Available Key-value Store, 21st ACM Symposium on Operating Systems Principles, Oct. 14-17, 2007, Stevenson, Washington, USA, pp. 205-220.

Karger, David et al., Consistent Hashing and Random Trees: Distributed Caching Protocols for Relieving Hot Spots on the World Wide Web, Proceedings of the twenty-ninth annual ACM Symposium on Theory of Computing, May 4-6, 1997, El Paso, Texas, United States, pp. 654-663, 1997.

Wikipedia, Hilbert curve, http://en.wikipedia.org/wiki/Hilbert_curve, Wikimedia Foundation, Inc., Jun. 10, 2010, 4 pages.

Wikipedia, Z-order (curve), http://en.wikipedia.org/wiki/Z-order_%28curve%29, Wikimedia Foundation, Inc., May 1, 2010, 3 pages.

Rose, Nicholas J., Hilbert-Type Space-Filling Curves, http://www4.ncsu.edu/~njrose/pdfFiles/HilbertCurve.pdf, North Carolina State University, 2001, pp. 1-17.

White, Tom, Consistent Hashing, http://weblogs.java.net/blog/2007/11/27/consistent-hashing, Oracle Corporation, Nov. 27, 2001, pp. 1-3.

Kleinpeter, Tom, Programmer's Toolbox Part 3: Consistent Hashing, http://www.tomkleinpeter.com/2008/03/17/programmers-toolbox-part-3-consistent-hashing/, Mar. 17, 2008, pp. 1-5.

Karger, David et al., Web Caching with Consistent Hashing, Computer Networks, vol. 31, Issues 11-16, May 17, 1999, pp. 1203-1213.

Office Action dated Jul. 23, 2012 for U.S. Appl. No. 12/850,975, pp. 1-27.

Office Action dated Mar. 14, 2013 for U.S. Appl. No. 12/850,975, pp. 1-17.

Office Action dated Aug. 14, 2013 for U.S. Appl. No. 12/850,975, pp. 1-218.

* cited by examiner

US 8,924,365 B2

SYSTEM AND METHOD FOR RANGE SEARCH OVER DISTRIBUTIVE STORAGE SYSTEMS

CROSS REFERENCE TO RELATED APPLICATION(S)

This application claims the benefit of U.S. provisional application No. 61/440,844, filed Feb. 8, 2011, which is incorporated by reference as if fully set forth.

BACKGROUND

This invention generally relates to computer network storage systems, and more particularly, to Prefix Hash Trees ("PHT") used in conjunction with an underlying Distributed Hash Table ("DHT") storage system for network applications and distributed databases.

During the past few years a revolution in scalable storage has been occurring. As the prevalence of web-based consumer services grows from e-commerce to social networking, there is an increasing demand for scalable storage systems that favor availability over consistency as contextually related to the Consistency, Availability and Partition Tolerance ("CAP") Theorem. In particular, traditional database management systems ("DBMS") that typically favor so-called Atomicity, Consistency, Isolation and Durability ("ACID") properties embodied through strong guarantees of transactional integrity are found to be lacking in terms of dynamic scaling. To address these concerns, there has been a movement toward so-called No Structured Query Language "NoSQL" systems, typically associated with so-called DHTs.

Although DHTs can provide significant improvement in terms of dynamic scaling, they are more limited in terms of the kinds of search operations they can support natively. An important aspect in the context of the within invention is range search. That is, the ability to retrieve a set of records in which a particular field falls within a pre-determined range, for example a search that finds all employees with a salary less than $70K.

Prefix Hash Trees ("PHTs") support search operations including 1 dimensional range queries over a DHT. PHTs further support heap queries, proximity queries, and limited multi-dimensional search operations. PHTs are trie-based data structures, wherein each node has either 0 or 2 children. A leaf node stores a key and includes a label which is a prefix of the key. Each leaf node stores a threshold number of keys, and each internal node contains an amount of keys equal to at least the threshold number plus one. Each leaf node includes a pointer to the leaf nodes to its immediate left and right. Ramabhadran et al., Prefix Hash Tree An Indexing Data Structure over Distributed Hash Tables, University of California, San Diego, 2004.

Using a PHT allows for efficient range search in which the underlying storage system is a DHT. However the original PHT research left open a number of practical details relating to managing write conflicts that are unavoidable in a setting in which availability is favored over consistency. Particularly, the omitted details become apparent in environments in which writers of data records may be acting independently yet in conflict, on physically separate components of the underlying DHT. Fundamental defects in the original PHT research such as a write conflict render the research infeasible without modification.

Consistency in the traditional DBMS/ACID sense is not a requirement of DHTs however "eventual consistency" is a requirement. Consistency in the traditional DBMS/ACID sense refers to the fact that when user A inserts record R into a DBMS, user B will have to wait a short time for user A to complete their insert transaction prior to being able to access and see record R within the DBMS, that is the affected portion of the DBMS will be made unavailable to user B for a short period of time. Eventual consistency generally means that given a sufficiently long period of time over which no inserts or updates are sent by a user, it can be expected that during that time period, all inserts or updates will eventually propagate through the system and all the replicas will be consistent. For example, when user A inserts record R into a system, and for some time subsequent to this insert, user B may not see record R but user B will not be precluded from accessing the affected portion of the system. However, after some time period of update or insert inactivity, record R will have been replicated across the DHT system and going forward all future readers will see record R.

What is needed is a method for resolving the various types of conflicts that will arise in a system based on the DHT/PHT algorithms associated with the underlying eventual consistency property of the underlying DHT.

SUMMARY

An embodiment according to the within invention comprises a computer implemented method for resolving eventual consistency conflicts when using a PHT and DHT. The method includes using an algorithm to create a prefix hash tree that relates to a distributed hash table, the prefix hash tree having multiple nodes, wherein the nodes comprise leaf nodes and internal nodes, aggregating all distinct records across all conflicting nodes, wherein conflicting nodes are nodes that have identical data records, and counting records returned to obtain a count, if the count of aggregated records exceeds a max record count then splitting the nodes that have records that exceed the max record count, such that the aggregated records are divided by a prefix into each new node, resulting in the consolidation of duplicate data that were in conflicting nodes into a single data record in a single node, if one or more of the returned conflicting nodes is an internal node, the internal node is split regardless of the number of aggregated records.

Another embodiment according to the within invention further comprises a computer implemented method for resolving eventual consistency conflicts when using a PHT and DHT. The method includes reading a node by a user, the node having conflicting records entered by different users prior to the reading by the user, the conflicting records having different content but are written to a same node of the tree, resolving the conflicting data by forcing a node split.

Another embodiment according to the within invention further comprises a computer implemented method for resolving eventual consistency conflicts when using a PHT and DHT. The method includes reading a record from a node by a user, the record having data that the user desires to delete, marking the record for deletion by updating a delete-indicator within the record.

Another embodiment according to the within invention comprises a computer implemented method for resolving eventual consistency conflicts when using a PHT and DHT. The method includes marking the record with a delete-timestamp.

Another embodiment according to the within invention further comprises a computer implemented method for resolving eventual consistency conflicts when using a PHT and DHT. The method includes the steps of using a computer software program to inspect the delete-indicator, if the delete-indicator lists the record as to be deleted then delete the record.

Another embodiment according to the within invention further comprises a computer implemented method for resolving eventual consistency conflicts when using a PHT and DHT. The method includes the steps of using a computer software program to inspect the delete-timestamp, if the delete-timestamp falls within a pre-determined time frame then delete the record.

Another embodiment according to the within invention comprises a method for resolving eventual consistency conflicts within a prefix hash tree. The method comprises the steps of using an algorithm to create a prefix hash tree that relates to a distributed hash table, the prefix hash tree having multiple nodes, wherein the nodes are leaf nodes and internal nodes, obtaining a maximum tree depth of the prefix hash tree, obtaining a max record count for each node, aggregating all distinct records across all conflicting nodes, wherein conflicting nodes are nodes that have identical data records, and counting record returned to obtain an aggregated record count, obtaining the nodes that are related to a new record that is to be inserted beginning at a deepest node, inserting the new record into the deepest node that has an aggregate record count less than the max record count, then obtaining a next node upward; and repeating the insert process when the aggregate record count is less than the max record count and the aggregate record count of the next node upward is less than the max record count, otherwise end insertion of the new record.

Another embodiment according to the within invention comprises an eventual consistency resolution system. The system includes one or more of a plurality of servers and one or more of a plurality of program storage devices readable by machine such that the one or more of a plurality of program storage devices and the one or more of a plurality of servers are connected together to form a network, wherein the one or more of a plurality of program storage devices embodies a program of instructions executable by the machine to perform a method for eventual consistency resolution. The method includes using an algorithm to create a prefix hash tree that relates to a distributed hash table, the prefix hash tree having multiple nodes, wherein the nodes are leaf nodes and internal nodes. A maximum tree depth of the prefix hash tree is obtained and a max record count for each node is obtained. The nodes that are related to a new record that is to be inserted beginning at a deepest node then continuing upward in the prefix hash tree are obtained. It is determined if a deepest node has an aggregate number of records that equal max record count. If the deepest node has an aggregate record count less than max record count then the new record is inserted into the deepest node and a next node upward is gotten, and it is determined if the aggregate record count is less than max record count. If the aggregate record count of the next node upward is less than max record count the insert process is repeated, otherwise insertion of the new record is ended.

The above and yet other objects and advantages of the within invention will become apparent from the hereinafter set forth Brief Description of the Drawings, Detailed Description of the Invention, and Claims appended herewith.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENT(S)

A PHT is a non-trivial, multi-node data structure built on top of a DHT. It is well known within the industry that building multi-node data structures on top of a DHT must be handled carefully, since DHTs typically only offer eventual consistency, which can make performing operations against the data structure non-trivial.

In an environment supporting only eventual consistency, conflicts will ultimately arise. The nature of these conflicts typically relates to conflicting data associated with a particular node which is associated with a given prefix. Where a conflict is observed is a property of the underlying DHT. However, a data conflict is generally observed during a read operation in a typical DHT implementation. That is, previous to the read, two or more clients have successfully written conflicting data to a data store associated with a particular node. When the read occurs, the conflicting data associated with the node is returned.

An embodiment according to the within invention preferably comprises a PHT Tree and Leaf structure. In the within Application, PHT Tree and Leaf Structure will also be referred to as a "PHT data structure" or a "data structure." The PHT Tree and Leaf structure is a binary Trie, also referred to as a Prefix Tree in which abstract nodes are associated with a prefix of index values in binary representation. Abstract nodes are mapped to DHT nodes via a pre-defined hash function applied to an abstract node prefix. In the PHT Tree and Leaf structure, RECORDs are only stored in LEAF nodes, not in INTERNAL nodes.

An embodiment according to the within invention comprises a primary operation wherein the primary operation is an "INSERT(Record r)." In this operation, a RECORD is inserted into a data structure. The RECORD includes a KEY k that is mapped into a set of binary strings of length D. A unique id associated with the entered RECORD is returned.

As records are added to a PHT, a LEAF node can reach a critical size then it is SPLIT. A SPLIT operation comprises translating the LEAF node into an INTERNAL node and creating two or more descendent nodes in which newly created LEAF nodes have both the pre-existing RECORDs and the newly added RECORD.

Figure 1:
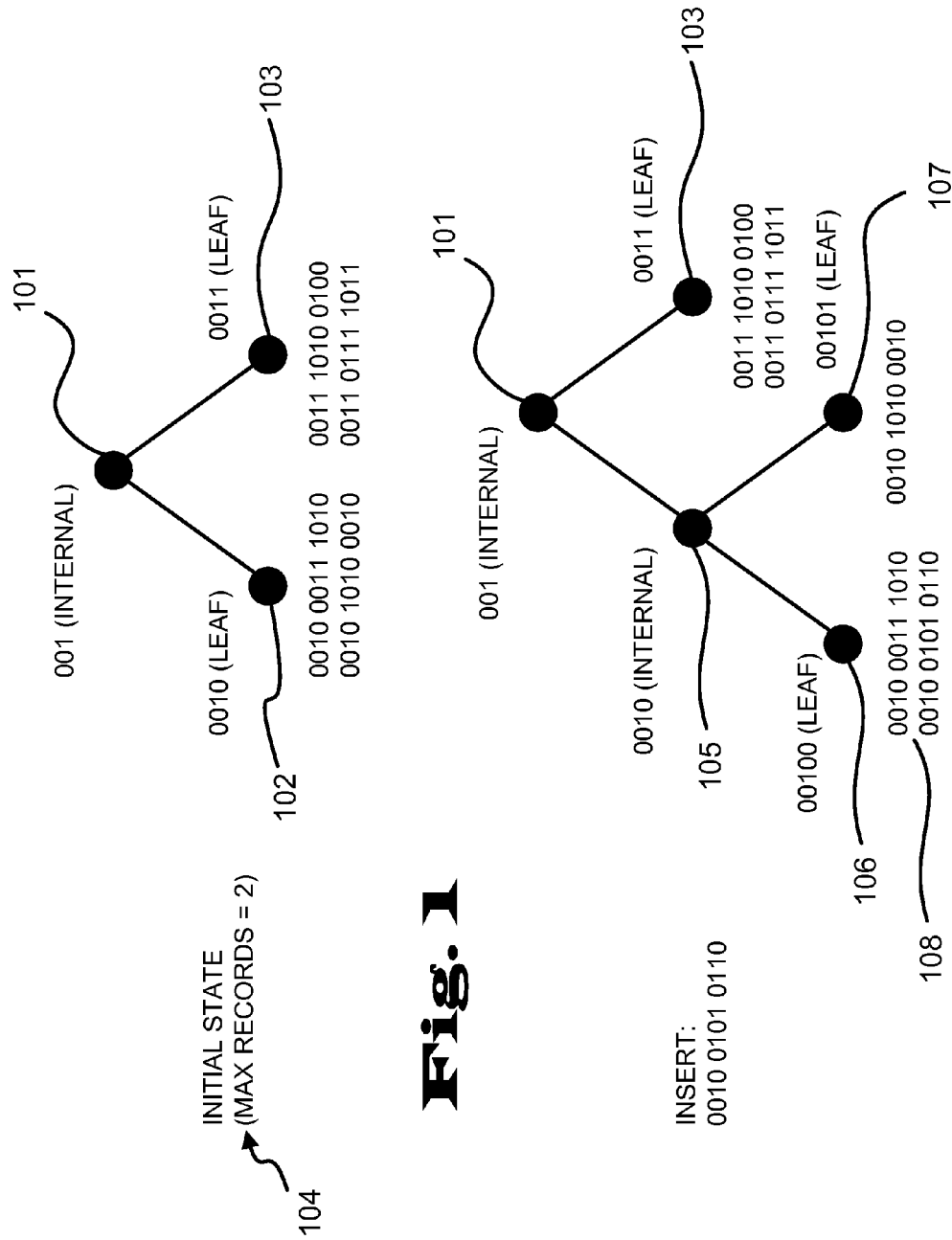
FIG. 1 is a diagram for translating and splitting a LEAF node into a new INTERNAL node and two LEAF nodes according to an embodiment of the within invention.

Referring to FIG. 1 that illustrates a PHT SPLIT operation according to an embodiment of the invention, an initial state of an INTERNAL node 101 having an index value of 001 is associated with 2 LEAF nodes, a LEAF node 102 having a prefix index value of 0010 and a LEAF node 103 having a prefix index value of 0011, however other prefix index values can be used. A MAX record count 104 is the maximum number of RECORDS that a LEAF node can have. In FIG. 1 the MAX record count 104 associated with the PHT is set at 2 records, however other values greater than or less than 2 can be used. When a user request or a system utility request is issued to add a new record 108, the MAX record count 104, is checked to determine if the LEAF node has reached its record limit. In FIG. 1 the new record has a value of 0010 0101 0110 and should be inserted into LEAF node 102 having an index of 0010. However LEAF node 102 has previously reached its MAX record count of 2 resulting in LEAF node 102 having to be translated into a new INTERNAL node 105 with two newly created descendent LEAF nodes associated with INTERNAL node 105, LEAF node 106 and LEAF node 107. According to an embodiment of the within invention, upon an INSERT operation for a LEAF node that has already reached its MAX record count 104 limit, in this example 2, a new INTERNAL node 105 is created under INTERNAL node 101. LEAF node 101 having index value 001 is split into 2 new LEAF nodes to be stored under new INTERNAL node 105. The new LEAF nodes are LEAF node 106 having an index value of 00100 and LEAF node 107 having an index value of 00101. The previous records 0010 0011 1010 and 0010 1010 0010 that were stored in LEAF 102 having an index value of 0010 are now split between new LEAF node 106 and new LEAF node 107. New record 108 is inserted into LEAF node 106 and new LEAF node 107 contains available space for any future insert request since MAX record count 104 remains set at 2.

PHTs and other multi-node data structures are susceptible to irrecoverable failure in high-availability environments. In particular, write conflicts on a particular node will happen, and these conflicts need to be resolved correctly in order to avoid permanent data loss. An embodiment according to the within invention comprises a method for managing write processing and any subsequent conflicts that may occur.

The PHT data structure and multi-node data structures using index ordering includes three principle properties that are stored permanently within the DHT substrate: node-state such as LEAF, INTERNAL and EMPTY, record-membership such as a list of records attached to a LEAF node or any node, and adjacency.

Decoupling the process of updating these properties on an INSERT operation may involve one or more SPLIT operations, which alleviates the potential for node read conflicts and simplifies the process of resolving conflicts when they do occur.

Instead of populating only the current LEAF node with a new record on an INSERT, a novel method is to populate all nodes starting at the maximum tree depth going upward in the tree toward the ROOT node stopping at a point where the number of records reaches a critical density. This method advantageously avoids having to move or migrate records in the process of a node split.

Figure 2:
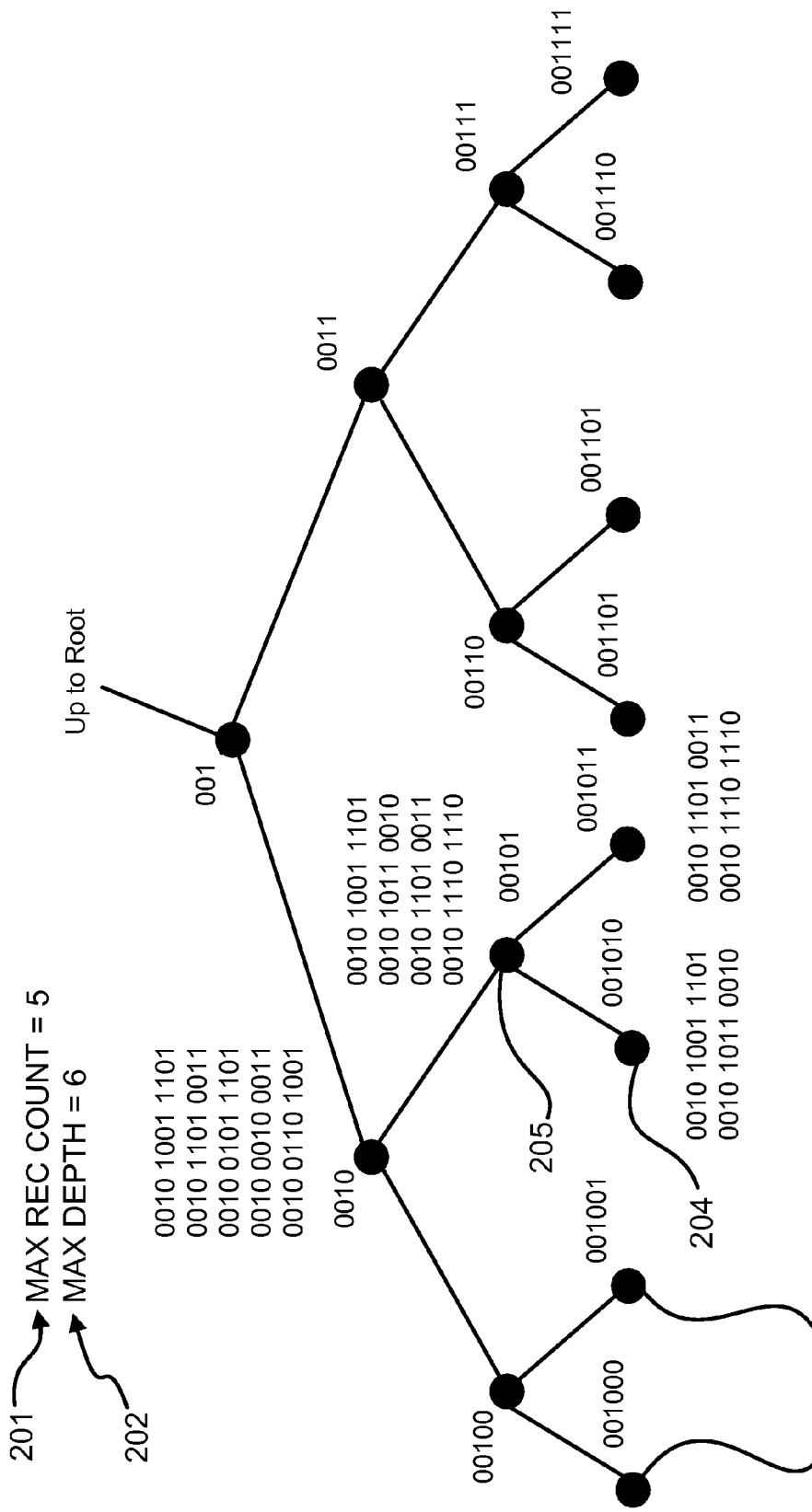
FIG. 2 is a diagram of nodes before record insertion according to an embodiment of the within invention.

Referring to FIG. 2 an example is illustrated of a PHT Tree and Leaf structure before record insertion according to an embodiment of the within invention. Max record count 201 is 5. This means that no node can have more than 5 records. The tree has a Max depth 202 of 6. Only the deepest nodes 203 of the tree are illustrated within FIG. 2. By way of example, writer A issues an INSERT(Record r) operation for record "0010 1001 1001" which will go into LEAF node 204 having a key of "001010." Record "0010 1001 1001" is first inserted in LEAF node 204, processing continues by recursively inserting record "0010 1001 1001" up the tree, inserting the record to each parent node until a node that has its Max record count 201 equal to 5. In FIG. 2 record "0010 1001 1001" will be added in LEAF node 204 having a key of "001010" and LEAF node 205 having a key of "00101."

Additional primary operations associated with a PHT according to an embodiment of the within invention is Set<Record>RANGE_SEARCH (T start, T end, long max) which is a search for records where KEY k lives in the index interval (T start, T end) where T represents an index value associated with the search, and returns no more than max records which is a count of records, and List<Record>NEAREST_NEIGHBOR_SEARCH (T center, long max), which is a search for records ordered by distance from a center index where T represents an index value associated with the search, this search also returns no more than max records which is a count of records.

According to an embodiment of the within invention a PHT is configured to allow for an efficient range search of RECORDs against a particular field associated with that RECORD. The field searched is indexed and referred to as a KEY. The KEY has values in some ordered set T with a metric such as an interval (0.0, 1.0) in real numbers that can be mapped in a natural way into a set of binary strings of length D. D is configurable and is associated with the size of the KEY space.

Due to the nature of data that is typically used in range search applications and in particular applications that are applying proximity in 2 dimensions associated with physical locations, so-called "hot spots" can occur where there is an unusually high density of keys in a particular small range. Additionally when dealing with physical locations it is possible to get a large number of records associated with a particular precise location such as the location of a shopping center having many stores or a sports arena having many teams.

For this reason a novel method is required when dealing with records having duplicate keys. According to an embodiment of the within invention when determining if a LEAF node is FULL, records associated with a duplicate key are not counted. That is, if a LEAF node is considered FULL when it contains N records, then in making this determination only DISTINCT key values are considered when counting the records. However, should it be necessary for a particular application, a method of storing the set of duplicate keys and their data values separately using an auxiliary indexing scheme can be used. That is, a sole record in the PHT data structure for a set of duplicate key records can be a pointer to auxiliary storage for this set of records.

As stated previously, when performing a SPLIT on a PHT LEAF node, conflicts can sometimes occur in terms of whether a particular node is a LEAF node or an INTERNAL node, and if it is a LEAF node what records are contained in that node. This can happen, for example, when conflicting writers perform INSERTS on separate parts of the underlying DHT and the conflict is observed only after the writes have completed back to the respective callers.

Conflicts can be detected internally within the DHT, either on subsequent internal writes occurring after the DHT has returned to the caller or during an internal "house cleaning" process, such as an operation involving Merkle trees. The DHT is also typically responsible for resolving so-called "causal" conflicts where it is clear that one write occurred after an earlier write and that the caller had access to information associated with this causal nature. In some systems this type of causal detection is managed through vector clocks.

Figure 3:
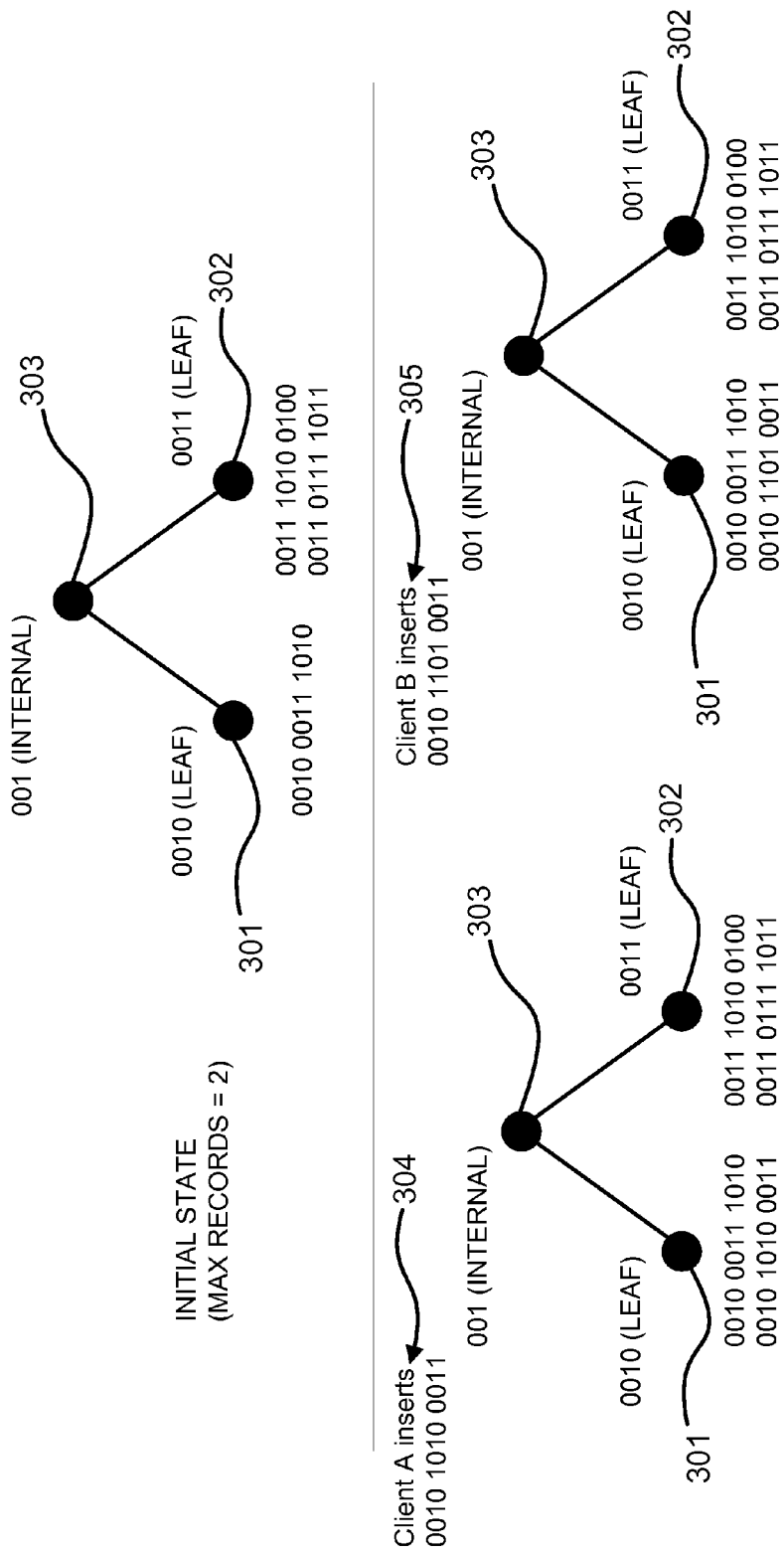
FIG. 3 is a diagram of a subsequent read on data having conflicting data records according to an embodiment of the within invention.

FIG. 3 illustrates an example of a write conflict. An initial state of the Leaf Structure has 2 LEAF nodes, node 301 having a key of 0010 and node 302 having a key of 0011. Both LEAF nodes point to INTERNAL node 303 having a KEY value of 001. LEAF node 301 has stored record 0010 0011 1010 and LEAF node 302 has stored records 0011 1010 0100 and 0011 0111 1011. Client-A 304 initiates an INSERT (Record r) operation for record 0010 1010 0011. Similarly Client-B 305 issues the same operation for the same record. On a subsequent read to node 301 having Key 0010 by another Client such as Client-C, a conflict will be returned since there are multiple notions of what should be included in node 301. According to an embodiment of the within invention when a node read conflict is returned, a method is performed comprising the steps of: aggregating all distinct records across all conflicting node values returned; if the number of aggregated records exceeds the MAX record count limit, then splitting the node, wherein the aggregated records are divided by prefix into each new node; and if one or more of the returned conflicting node values is an INTERNAL node, splitting the node regardless of the number of aggregated records. When conflicts are detected on a subsequent read as in the above example, a user for example Client-C is responsible for resolving the conflict by writing back the correct value to the associated node. In this example upon a read by Client-C, it is determined that LEAF node 301 has 3 unique records associated with it, a first record 0010 0011 1010, a second record 0010 1010 0011 and a third record 0010 1101 0011, therefore a split will occur since MAX record count limit is set at 2 and new internal node 0010 will be created (not shown) having a new LEAF node 00100 (not shown) containing record 0010 0011 1010 and a new LEAF node 00101 (not shown) containing record 0010 1101 0011 and record 0010 1010 0011.

This process can be proven to be effective against corrupting the PHT tree structure. However when searching for a LEAF node using binary search, it may happen that a read on a node incorrectly returns an EMPTY value leading to the binary search to land incorrectly on an INTERNAL node. This can be resolved by simply retrying the binary search.

It is possible that a record can become orphaned on an INTERNAL node. If a binary search or cached LEAF values are used by clients, it may be the case that this INTERNAL node is never revisited, and thus the conflict is not resolved and the written record remains orphaned.

This is a fairly mild defect and occurs only under fairly artificial behavior, but it is possible. To resolve this potential defect, a number of things can be done, including replacing a binary search or LEAF value caching with a linear search beginning at the ROOT node. Additionally a complete tree scan can be performed periodically, looking for conflicting reads since this will detect an orphaned record, and the above process will resolve the conflict.

In many applications, KEY density can be highly non-uniform. That is, many keys can be associated with a narrow range of key space, and possibly many records can be associated with the same identical key. For example, keys can be associated with physical locations, such as a pizza shop that operates under a single name having many locations. When dealing with duplicate keys, it is preferable to avoid generating multiple RECORD objects in the PHT that are associated with every inserted RECORD.

Figure 4:
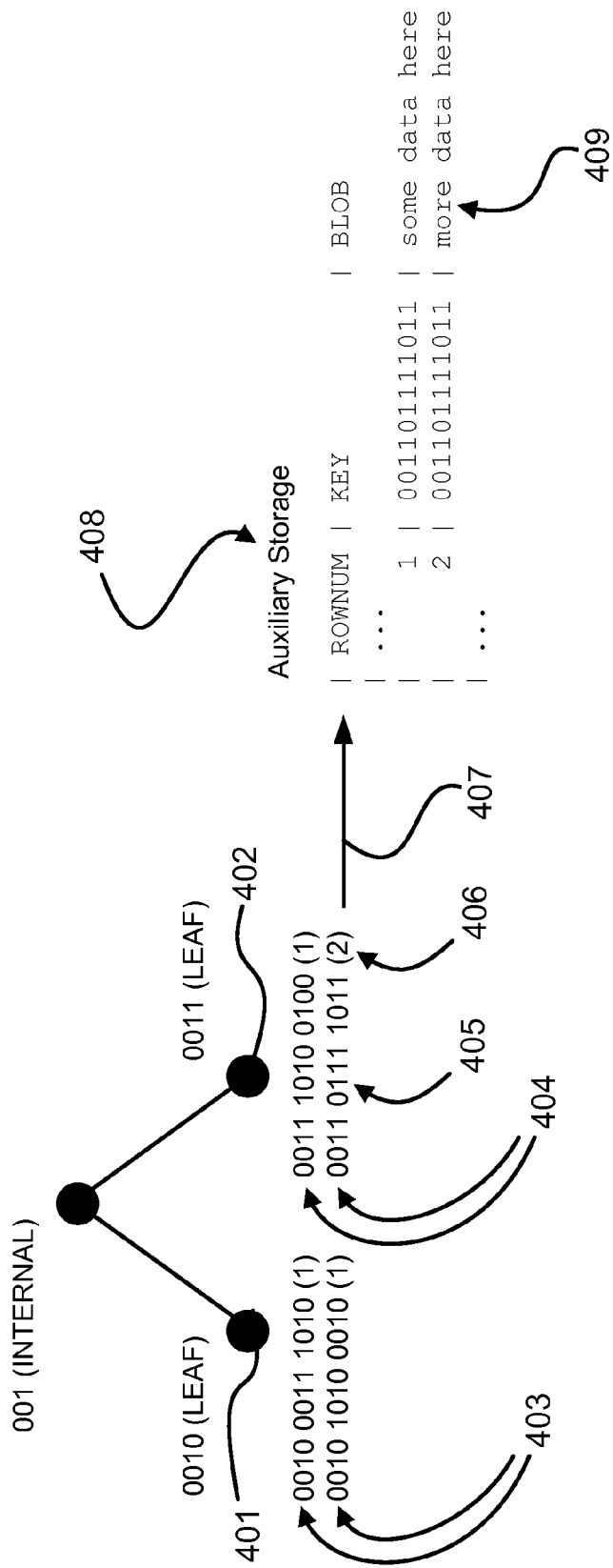
FIG. 4 is a diagram illustrating a relationship between record stores and auxiliary data storage according to an embodiment of the within invention.

FIG. 4 illustrates an example of a method for controlling KEY density according to an embodiment of the within invention. LEAF node 401 having KEY value 0010 stores a list of references with each RECORD 403 associated with KEY value 0010. These references or id's are unique identifiers to the underlying content associated with individual RECORDs 403. LEAF node 401 has two RECORDs 403, that is 0010 0011 1010 (1) and 0010 1010 0010 (1). In an embodiment according to the within invention LEAF node 402 has stored RECORDs 404. Stored RECORDs 404 comprise a KEY 405, a RECORD COUNT 406 indicating how many records are stored under KEY 405, and a META-REFERENCE 407 that is a pointer to AUXILLIARY storage 408 that contains DATA 409 associated with RECORDs 404. The META-REFERENCE 407 can be stored in an auxiliary data store that in turn keeps a list of individual record references. The META-REFERENCE 407 can be implied as a function of the KEY 405.

A primary operation associated with a PHT according to an embodiment of the within invention is a Boolean DELETE (long id) which deletes the associated record from an index.

Any general purpose data store must support a DELETE capability. Typically when employing a complex data structure such as a b-tree or trie, the inserting of records into leaves and the resulting splitting of nodes is seen as a symmetric operation. As records are deleted, descendent nodes can be merged and this process can occur recursively up the tree toward the ROOT node.

Unfortunately this process becomes unwieldy when managed within an environment supporting only "eventual consistency" from the key/value store perspective. To overcome this, an embodiment according to the within invention preferably avoids actually removing records upon delete, and instead simply marks them for deletion. This process can include a timestamp, and at some later date a periodic process can be used to reclaim records marked for deletion. The existence of a timestamp dramatically reduces the risk of conflict or data loss.

According to an embodiment of the within invention when records are marked for deletion, the records are not immediately removed. In the event that two writers conflict, and one intended to delete a record, the conflict resolution process will have no way to know that the delete was intentional. To overcome this issue the record is marked as deleted as opposed to restructuring the tree. By marking it as deleted, the delete intention will be clear and the conflict can be resolved. This advantageously allows timestamps associated with the deletion flag to be used for later "garbage collection", thereby removing deleted records that have been flagged for a certain minimum time. Records marked for deletion are simply ignored rather than restructuring the tree.

An embodiment according to the within invention comprises avoiding MERGING of nodes. In many application domains it is entirely practical to leave under-populated or empty LEAF nodes in place, having an end result of trading efficiency for enhanced stability. In certain instances and application domains this may not be practical. In such a case marking a record for deletion with timestamp, can effectively be used.

The merging of nodes can be the source of a number of types of data corruption in the PHT data structure under the normal circumstances of a DHT. A solution is not to merge nodes. Under many real-world scenarios, not merging is OK since records can be removed or marked as deletions. There is nothing structurally wrong with a PHT having empty LEAF nodes.

Figure 5:
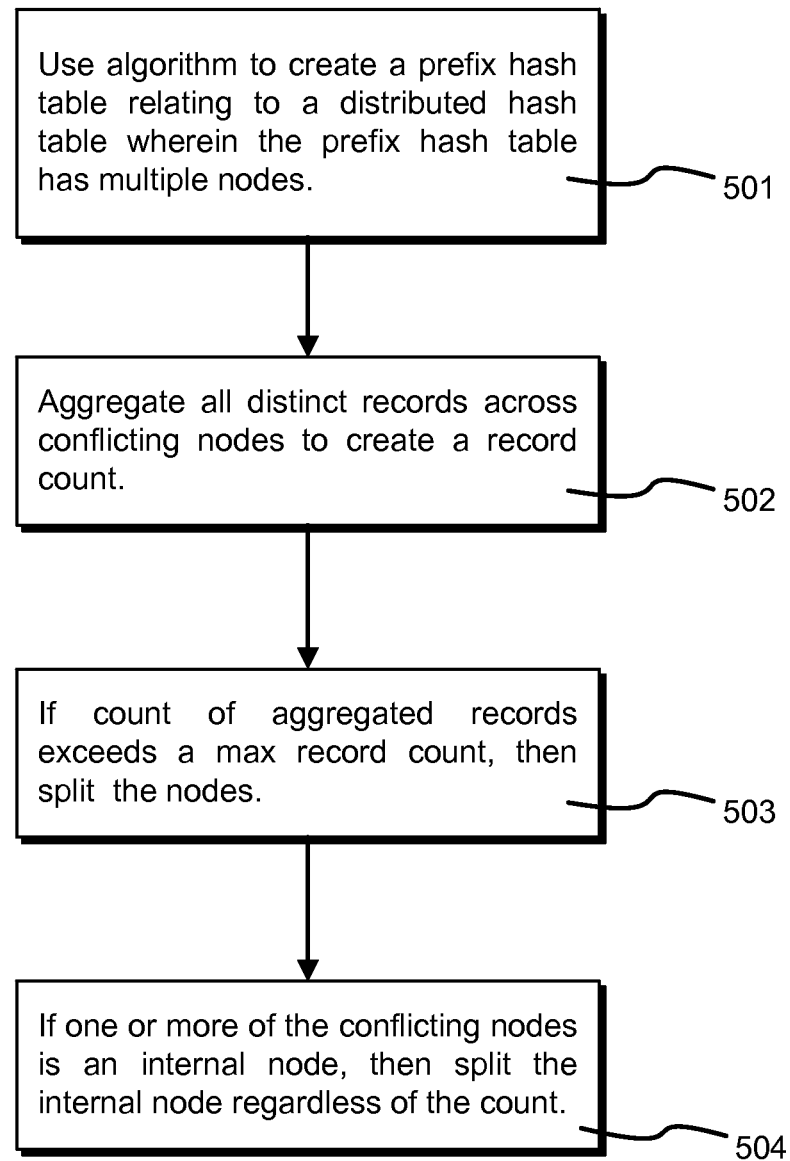
FIG. 5 is a diagram illustrating a method of resolving conflicting nodes according to an embodiment of the within invention.

FIG. 5 illustrates a method for resolving conflicting nodes according to an embodiment of the within invention. An algorithm is used to create a prefix hash tree relating to a distributed hash table wherein the prefix hash tree has multiple nodes (Step 501). All distinct records across conflicting nodes are aggregated to create a count of records (Step 502). If the count of aggregated records exceeds a maximum record count then the nodes are split (Step 503). If one or more of the conflicting nodes is an internal node then split the node (Step 504).

Figure 6:
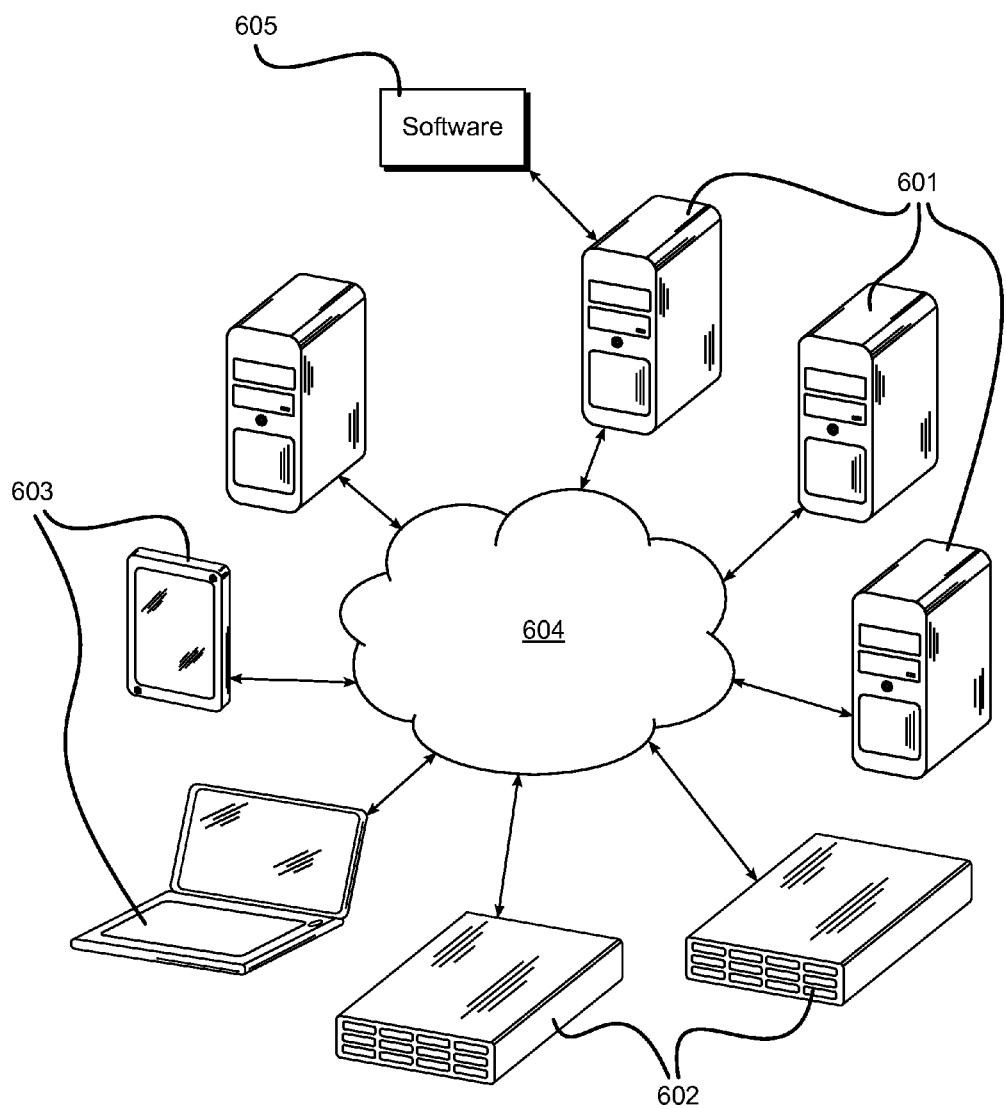
FIG. 6 is a diagram illustrating a system according to an embodiment of the within invention.

FIG. 6 illustrates a system for resolving conflicting nodes according to an embodiment of the within invention. Servers 601, storage devices 602, personal computers 603 such as laptops, tablets, smart-phones, cellular devices, main frame computers and any other device that enables a user to have internet access, are networked together. The network can be configured using at least one of internet 604, wireless, broadband and hard-wired such as cable. A program of instructions 605 is executable by a machine, to perform a method comprising the steps of: using an algorithm to create a prefix hash tree relating to a distributed hash table wherein the prefix hash tree has a plurality of nodes including at least one of a LEAF node and an INTERNAL node, aggregating all distinct records across conflicting nodes to create a count of records wherein conflicting nodes are nodes having at least one identical record, splitting the nodes if the count of aggregated records exceeds a maximum record count and splitting the nodes if one or more of the conflicting nodes is an internal node. The program of instructions can be stored on any device having storage capabilities that is networked together such as the servers 601, storage devices 602, and personal computers 603 of any type.

Having described embodiments for a system and method for range search over distributive storage systems, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A computer-implemented method for resolving eventual consistency conflicts within a prefix hash tree comprising the steps of:
   using an algorithm to create a prefix hash tree that relates to a distributed hash table, the prefix hash tree having multiple nodes, wherein the nodes comprise leaf nodes and internal nodes;
   aggregating all distinct records across all conflicting nodes, wherein conflicting nodes are nodes that have identical data records, and counting records returned to obtain an aggregated record count;
   splitting the conflicting nodes that have the aggregated record count exceeding a max record count, such that the aggregated records are divided by a prefix into each new node, resulting in the consolidation of duplicate data that were in conflicting nodes into a single data record in a single node; and
   splitting conflicting nodes that are internal nodes regardless of the aggregated record count.

2. The compute implemented method of claim 1, further comprising the steps of:
   reading a node by a user, the node having conflicting records entered by different users prior to the reading by the user, the conflicting records having different content but are written to a same node of the tree; and
   resolving the conflicting records by said splitting.

3. The computer-implemented method of claim 1, further comprising the steps of:
   reading a record from a node by a user, the record having data that the user desires to delete; and
   marking the record for deletion by updating a delete-indicator within the record.

4. The computer-implemented method of claim 3, wherein the step of marking further includes marking the record with a delete-timestamp.

5. The computer-implemented method of claim 4, further comprising the steps of:
   executing a computer software program to inspect the delete-timestamp; and
   if the delete-timestamp falls within a pre-determined time frame, then delete the record.

6. The computer-implemented method of claim 3, further comprising the steps of:
   executing a computer software program to inspect the delete-indicator; and
   if the delete-indicator lists the record as to be deleted, then delete the record.

7. A computer-implemented method for resolving eventual consistency conflicts within a prefix hash tree comprising the steps of:
   using an algorithm to create a prefix hash tree that relates to a distributed hash table, the prefix hash tree having multiple nodes, wherein the nodes are leaf nodes and internal nodes;
   obtaining a maximum tree depth of the prefix hash tree;
   obtaining a max record count for each node;
   aggregating all distinct records across all conflicting nodes, wherein conflicting nodes are nodes that have identical data records, and counting records returned to obtain an aggregated record count; obtaining the nodes that are related to a new record that is to be inserted beginning at a deepest node;
   inserting the new record into the deepest node that has an aggregate record count less than the max record count, then obtaining a next node upward; and
   repeating the insert process when the aggregate record count is less than the max record count and the aggregate record count of the next node upward is less than the max record count, otherwise end insertion of the new record.

8. The computer-implemented method of claim 7, further comprising the steps of:
   reading a node by a user, the node having conflicting records entered by different users prior to the reading by the user, the conflicting records having different content but are written to a same node of the tree;
   if the number of a rented records exceeds a max record count limit, then splitting the node;
   wherein the aggregated records are divided by a prefix into each new node; and
   if one or more of the returned conflicting node values is an internal node, splitting the node regardless of the number of aggregated records.

9. The computer-implemented method of claim 7, further comprising the steps of:
   reading a record from a node by a user, the record having data that the user desires to delete; and
   marking the record for deletion by updating a delete-indicator within the record.

10. The computer-implemented method of claim 7, wherein the step of marking further includes marking the record with a delete-timestamp.

11. The computer-implemented method of claim 10, further comprising the steps of:
   executing a computer software program to inspect the delete-timestamp; and
   if the delete-timestamp falls within a pre-determined time frame, then delete the record.

12. The computer-implemented method of claim 7, further comprising the steps of:

executing a computer software program to inspect the delete-indicator; and if the delete-indicator lists the record as to be deleted, then delete the record.

13. A computer-implemented method for resolving eventual consistency within a prefix hash tree, the method comprising the steps of:
using an algorithm to create a prefix hash tree that relates to a distributed hash table, the prefix hash tree having multiple nodes, wherein the nodes comprise leaf nodes and internal nodes;
reading a node by a user, the node having conflicting records entered by different users prior to the reading by the user, the conflicting records having different content but are written to a same node of the tree;
aggregating all distinct records across all conflicting node values returned;
if the number of aggregated records exceeds a max record count limit, then splitting the node;
wherein the aggregated records are divided by a prefix into each new node; and
if one or more of the returned conflicting node values is an internal node, splitting the node regardless of the number of aggregated records.

14. An eventual consistency resolution system comprising:
at least one of a plurality of servers;
at least one of a plurality of program storage devices readable by machine such that the at least one of a plurality of program storage devices and the at least one of a plurality of servers are connected together to form a network, wherein the at least one of a plurality of program storage devices embodies a program of instructions executable by the machine to perform method steps for eventual consistency resolution, the method steps comprising:
using an algorithm to create a prefix hash tree that relates to a distributed hash table, the prefix hash tree having multiple nodes, wherein the nodes are leaf nodes and internal nodes;
obtaining a maximum tree depth of the prefix hash tree;
obtaining a max record count for each node;
aggregating all distinct records across all conflicting nodes, wherein conflicting nodes are nodes that have identical data records, and counting records returned to obtain an aggregated record count; obtaining the nodes that are related to a new record that is to be inserted beginning at a deepest node;
inserting the new record into the deepest node that has an aggregate record count less than the max record count, then obtaining a next node upward; and
repeating the insert process when the aggregate record count is less than the max record count and the aggregate record count of the next node upward is less than the max record count, otherwise ending insertion of the new record.

15. The system of claim 14, wherein the machine comprises at least one of a server, a personal computer, a tablet computer, a smart-phone, a cellular device, and a main-frame computer.

16. The system of claim 14, wherein the network comprises at least one of wireless, broadband, hard-wired, and internet.

17. The system of claim 14, wherein the method further comprises the steps of:
reading a node by a user, the node having conflicting records entered by different users prior to the reading by the user, the conflicting records having different content but are written to a same node of the tree;
if the number of aggregated records exceeds a max record count limit, then splitting the node;
wherein the aggregated records are divided by a prefix into each new node; and
if one or more of the returned conflicting node values is an internal node, splitting the node regardless of the number of aggregated records.

18. The system of claim 14, wherein the method further comprises the steps of: reading a record from a node by a user, the record having data that the user desires to delete; and
marking the record for deletion by updating a delete-indicator within the record.

19. The system of claim 14, wherein the step of marking further includes marking the record with a delete-timestamp.

20. The system of claim 14, wherein the method further comprises the steps of:
executing a computer software program to inspect the delete-timestamp; and
if the delete-timestamp falls within a pre-determined time frame, then delete the record.

* * * * *